(12) United States Patent
Eyrainer

(10) Patent No.: US 6,325,410 B1
(45) Date of Patent: Dec. 4, 2001

(54) SIDE IMPACT PROTECTION SYSTEM

(75) Inventor: Heinz Eyrainer, Waldstetten (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/659,427

(22) Filed: Sep. 8, 2000

(30) Foreign Application Priority Data

Sep. 8, 2000 (DE) .......................................... 299 15 820 U

(51) Int. Cl.$^7$ ................................................. B60R 21/22
(52) U.S. Cl. ..................................... 280/730.2; 280/728.3
(58) Field of Search ........................... 280/728.1, 728.2, 280/728.3, 730.1, 730.2

(56) References Cited

U.S. PATENT DOCUMENTS

| | | | | |
|---|---|---|---|---|
| 5,308,112 | * | 5/1994 | Hill et al. ........................... | 280/730.2 |
| 5,324,072 | * | 6/1994 | Olson et al. ....................... | 280/730.2 |
| 5,868,421 | * | 2/1999 | Eyrainer ............................. | 280/730.2 |
| 5,979,932 | * | 11/1999 | Jourdaine et al. ................ | 280/730.2 |
| 6,010,150 | * | 1/2000 | Amann ............................... | 280/730.2 |
| 6,073,959 | * | 6/2000 | Heinz et al. ......................... | 280/729 |
| 6,086,091 | * | 7/2000 | Heinz et al. ...................... | 280/728.3 |
| 6,106,005 | * | 8/2000 | Heinz et al. ...................... | 280/730.2 |

FOREIGN PATENT DOCUMENTS

| | | |
|---|---|---|
| 433069 | 3/1995 | (DE) . |
| 29603316 | 8/1996 | (DE) . |
| 29604892 | 10/1996 | (DE) . |

OTHER PUBLICATIONS

JP 5–4553 Patents Abstracts of Japan, M–1416, May 25, 1993, vol. 17, No. 268.

* cited by examiner

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

The invention relates to an inflatable side impact protection system for an occupant of a vehicle having a side-panel and a window section in the side-panel. The protection system comprises a gas bag which when packed has a specific pack length, a gas generator for inflating the gas bag, and a side-panel covering. The window section is provided which has a lower edge, the side-panel covering having an upper end piece which terminates the covering at the lower edge of the window section. The gas bag when packed is arranged under the end piece and in a deployed state covers the vehicle side panel over a large area for protecting at least one of the thorax and pelvic region of the occupant. The end piece is constructed, at least over sections, as a flap which, when swung open, defines a downward pointing ejection channel for the gas bag.

14 Claims, 3 Drawing Sheets

SIDE IMPACT PROTECTION SYSTEM

TECHNICAL FIELD

The invention relates to an inflatable side impact protection system for an occupant of a vehicle having a side-panel and a window-section in the side-panel.

BACKGROUND OF THE INVENTION

Side impact protection systems that are to protect the pelvic region or the thorax region of the vehicle occupant are either integrated laterally in the backrest or in the side panel (i.e. in the vehicle door or, in the case of a two- or three-door vehicle, in the region of the rear-seat occupants in the side panel itself). The known gas bag modules are very thick when the gas bag is packed because the gas bag is folded in several directions and has a compressed pack volume. When unfolding it either emerges from the backrest and unfolds towards the front or from the side-panel covering which has a predetermined opening line. The known side gas bags for the thorax and pelvic regions have a considerable depth in the inflated state (horizontal, transverse to the direction of travel) and therefore there is a risk of, for example, sleeping occupants who have placed themselves against the side panel being injured by the deploying gas bag. Also, the covering which might tear open represents a certain potential danger because it also moves in the direction towards the occupants.

BRIEF SUMMARY OF THE INVENTION

The invention provides a side impact protection system which, in so-called OOP (Out Of Position) positions, creates a lesser potential hazard. Furthermore, the protection system according to the invention is distinguished by better means of accommodating it in the side panel.

This is accomplished in a protection system which comprises a gas bag which when packed has a specific pack length, a gas generator for inflating the gas bag, and a side-panel covering. The side-panel covering has an upper end piece which terminates the covering at a lower edge of the window section. The gas bag when packed is arranged under the end piece and in a deployed state covers the vehicle side panel over a large area to a side of at least one of the thorax and pelvic region of the occupant in order to protect the thorax and/or the pelvic region. The end piece is constructed, at least over sections, as a flap which, when swung open, defines a downward pointing ejection channel for the gas bag. The protection system according to the invention is distinguished by a wide-area side gas bag whose direction of deployment is largely defined by the end piece. The main direction of deployment is downward, i.e. aimed essentially parallel to the door and not, as in the known side gas bags for the thorax and pelvic region, in the direction towards the occupant. The deployed gas bag extends from the upper end piece downward. The gas bag according to the invention thus preferably has a wide area and little thickness in the inflated state so that the hazard presented to the occupants is reduced.

The end piece has preferably a lower edge which is releasably held in place on the remainder of the side-panel covering. The upper end piece, which is usually made of plastic not covered by textile fabric and represents a separate part of the entire side-panel covering, must usually be attached in any case to the lower edge. The redesign of the previously known side-panel covering is therefore only slightly affected by the protection system according to the invention.

In accordance with the preferred embodiment, the releasable attachment is a trim strip of the side-panel covering, that is another part which is already known and provided, behind which the lower edge of the end piece extends and which clamps the lower edge.

As mentioned above, the gas bag according to the invention should be designed with a wide area, or to be more precise it should extend at least up to the armrest in the side panel and, in the longitudinal direction, preferably at least over approximately half the length of the related side panel.

In the packed state, the gas bag should have an elongated shape which results in a small pack thickness and facilitates its accommodation.

The thickness of the module (gas generator, gas bag, and possibly housing) can be reduced by arranging the gas generator outside of the gas bag. A gas conveying tube which might be provided connects the gas generator to the interior of the gas bag.

The deployment time and the risk of being hit by the deploying gas bag can be reduced even further by the flap having a length which is at least equal to the pack length of the gas bag. This means that the gas bag can emerge from the side panel over its entire pack length, thereby reducing its deployment time.

The side impact protection system according to the invention is integrated according to the preferred embodiment in the side-panel covering in such a way that it forms together with the side-panel covering a completely preassembled unit.

DETAILED DESCRIPTION OF THE PREFERRED EMBODIMENT

Figure 1:
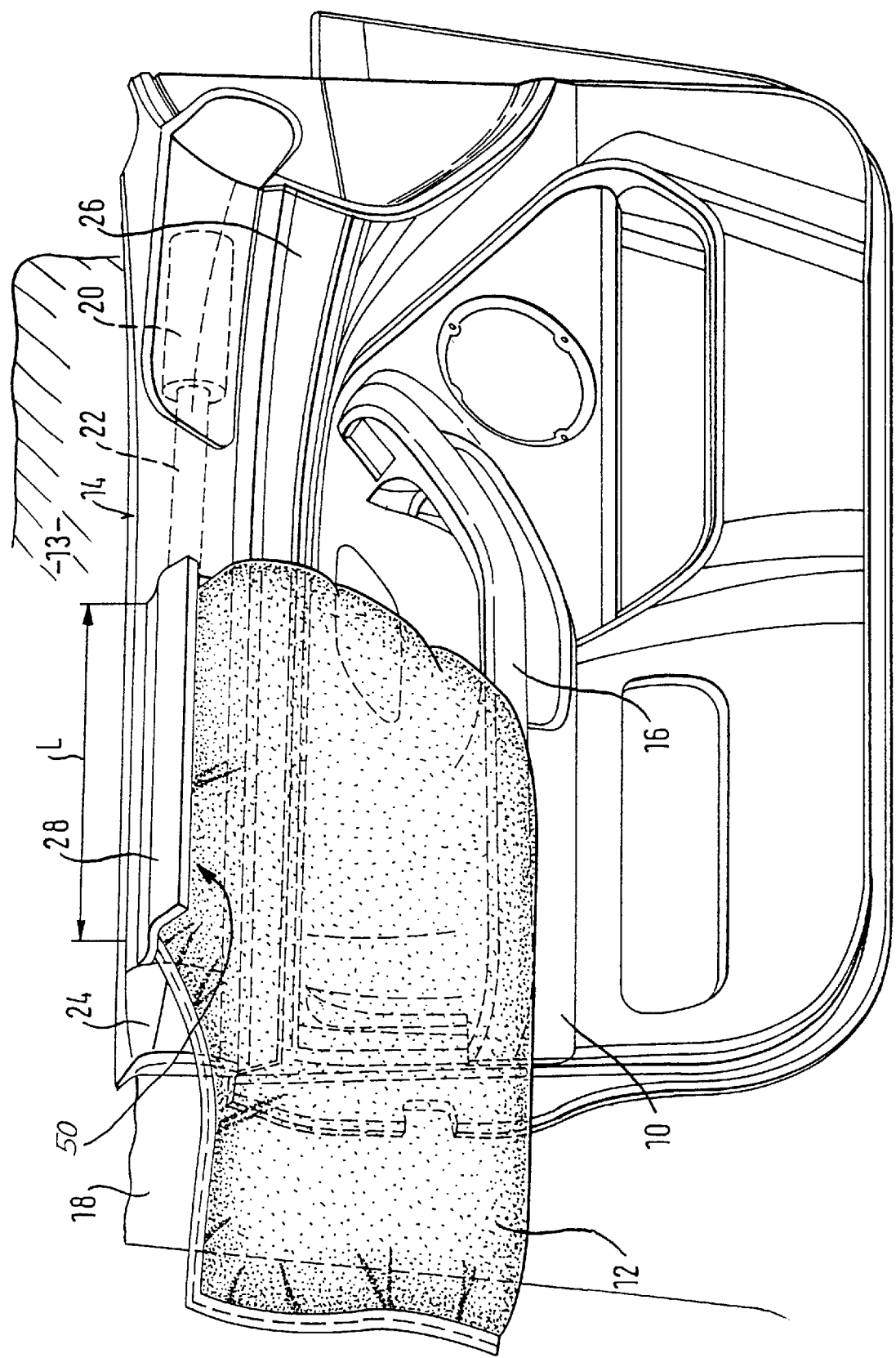
FIG. 1 shows a side door with inflated gas bag as part of the side impact protection system according to the invention.

In FIG. 1, an inflated side impact protection system for vehicle occupants is shown, here for a vehicle front occupant. The protection system is accommodated in the side-panel covering 10. Since the side panel is formed in the present case by the vehicle door, the term door trim panel will be used below. The embodiment shown can also be used correspondingly for the rear section of the vehicle in such cases where no provision has been made for a door there. The side impact protection system has a wide-area gas bag 12 which has a relatively small thickness but which covers a great part of the door (side panel) and thus protects the thorax and pelvic region of the occupant. The gas bag 12 extends from the lower edge 14 of the window section 13 (shown as a hatched cut-out in FIG. 1) to beyond the armrest 16 downward, up to half the door toward the front and toward the rear beyond the door and covers the B-pillar 18 of the vehicle.

The protection system also comprises a gas generator 20 shown with broken lines and accommodated behind the door trim panel 10. The gas generator 20 is accommodated outside of the gas bag 12 but is connected to the interior of the gas bag 12 through a gas conveying tube 22 which will be explained later in more detail in conjunction with FIG. 2.

The door trim panel 10 consists of several parts connected together. One of these parts is an upper end piece 24 that extends in a curved shape toward the inside starting at the lower edge of the window section 13 and then continues downward and extends up to a trim strip 26 which passes over the entire length of the door trim panel 10. The upper end piece 24 has a section which is designed in the form of a flap 28. The length of the flap 28 is somewhat longer than the pack length L of the gas bag 12. In the packed state, the gas bag 12 has a small thickness but an elongated shape so that it can easily be accommodated under the upper end piece 24. Furthermore, the gas conveying tube 22 has a smaller cross-section than the gas generator 20 and contributes towards making it easy for the protection system to be accommodated in the door trim panel. Also, the gas conveying tube 22 extends over the entire pack length L of the gas bag. This has the advantage that the gas flows into the gas bag uniformly over a wide area and that the gas bag can deploy downward rapidly and uniformly, as shall be explained below.

Figure 2:
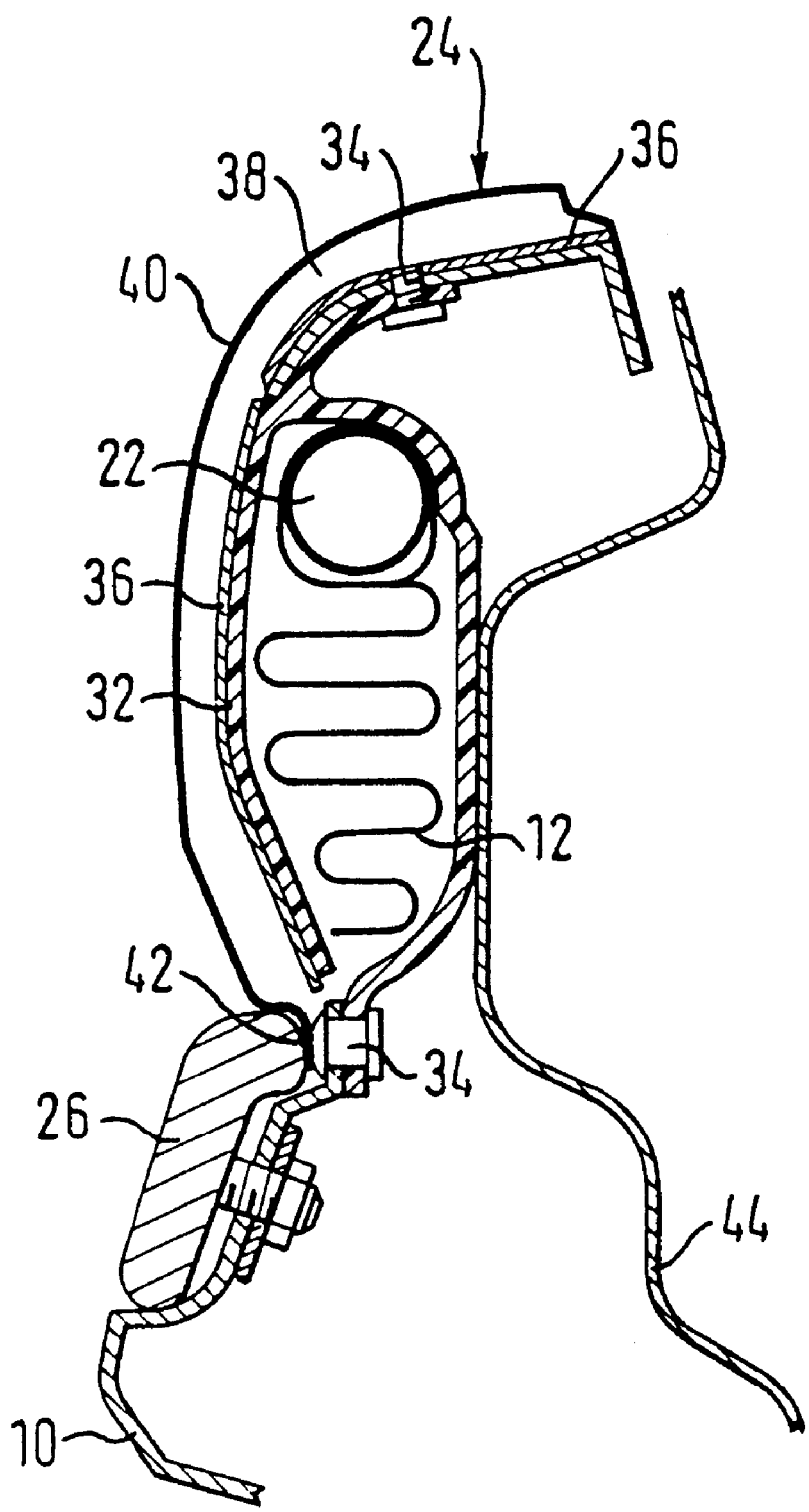
FIG. 2 shows a cross-sectional view through the embodiment shown of the side impact protection system according to the invention when the gas bag is in the packed state.
Figure 3:
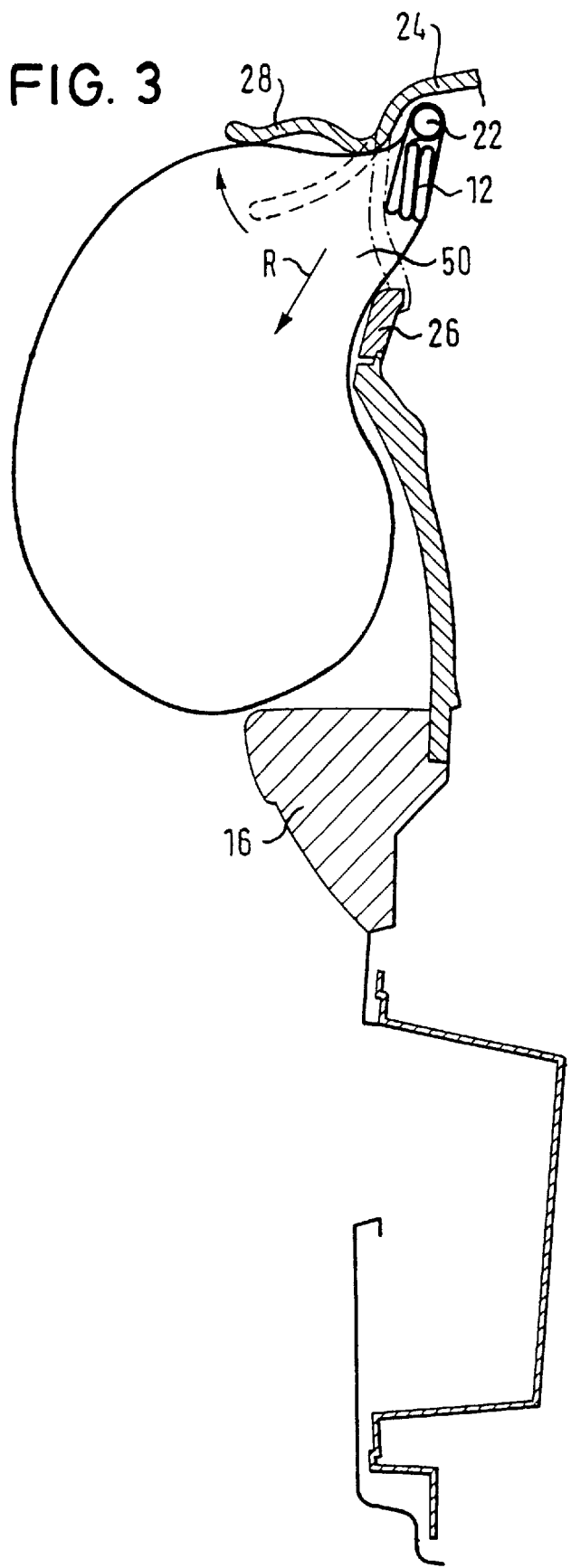
FIG. 3 shows a cross-sectional view through the protection system according to the invention shown in FIG. 2 when the gas bag is deployed.

In FIG. 2 it can be seen that the gas bag and the gas conveying tube have small cross-sectional dimensions and can be accommodated easily under the upper end piece 24. The gas conveying tube 22 and the gas bag 12 are surrounded by a receptacle 32 that forms so to speak a housing for the gas bag and the gas conveying tube and can also be designated gas bag module housing. The receptacle 32 holds the gas bag 12 in its packed state and is fastened to the door trim panel by means of screws 34. To be more precise, the receptacle 32 is attached on the one hand by means of screws to the so-called foam carrier 36 of the upper end piece 24. On top of the foam carrier 36 there is a foamed zone 38 and on top of this there is an external film 40 to make up the upper end piece 24. In the region of its lower edge, on the other hand, the receptacle 32 is screwed onto another part of the covering. As can be seen in FIG. 2, the upper end piece has a thin lower edge 42 which extends behind the trim strip 26 and is clamped by it. The trim strip 26 thus forms a releasable fixing means for the lower edge 42. The door-inner plate has the reference number 44.

In a restraint situation, the gas generated by the gas generator 20 flows through the gas conveying tube 22 into the interior of the gas bag 12. The gas bag begins to deploy and here deployment must mainly take place in the downward direction only. The gas bag 12 forces apart the receptacle 32, which has an open profile in its cross-section, and forces the lower edge 42 out of its attachment by the trim strip 26. The flap 28 swings outward due to its flexibility and at the same time provides a predetermined resistance to the swing process. Between flap 28 and trim strip 26 a so-called ejection channel 50 is produced which determines the direction of deployment at the beginning of the deployment process. The main direction of deployment, indicated by the arrow R, is therefore obliquely downward. The gas bag 12 should thus deploy rapidly not in the direction towards the occupant but downward as parallel as possible to the door and it should make available its entire surface as restraint surface as rapidly as possible.

The protection system shown is integrated in the door trim panel 10 and together with this forms a preassembled unit.

The protection system according to the invention represents a low potential danger for occupants leaning against the side panel or door because the flap 28 does not swing out particularly far and the gas bag deploys in the downward direction. An occupant leaning against the flap 28 also cannot substantially delay deployment because the flap 28 is very long which means that a long opening line results along which the gas bag 12 can deploy.

What is claimed is:

1. An inflatable side impact protection system for an occupant of a vehicle having a side-panel and a window section in said side-panel, said protection system being integrated in said vehicle side panel and comprising a gas bag which when packed has a specific pack length, a gas generator for inflating said gas bag, and a side-panel covering, said side-panel covering having an upper end piece which terminates said covering at a lower edge of said window section, said gas bag when packed being arranged under said end piece and in a deployed state covering said vehicle side panel over a large area for protecting at least one of the thorax and pelvic region of the occupant, and said end piece being constructed, at least over sections, as a flap which, when swung open, defines a downward pointing ejection channel for said gas bag.

2. The protection system according to claim 1, wherein a fixing means is provided and wherein said end piece has a lower edge which is held in place on a remainder of said side-panel covering by said fixing means that can be released by said gas bag when deploying.

3. The protection system according to claim 2, wherein said releasable fixing means is a trim strip of said side-panel covering, said lower edge of said end piece extending behind said trim strip which clamps said lower edge of said end piece.

4. The protection system according to claim 1, wherein said gas bag in a deployed state extends at least up to an armrest in said side panel.

5. The protection system according to claim 1, wherein said gas bag in said packed state has an elongated shape.

6. The protection system according to claim 1, wherein said gas generator is arranged outside of said gas bag.

7. The protection system according to claim 6, wherein said gas generator is connected to an interior of said gas bag by means of a gas conveying tube which extends along said pack length of said gas bag and extends into said gas bag.

8. The protection system according to claim 7, wherein a flexible receptacle is provided for said packed gas bag and said gas conveying tube, said receptacle being fastened to said side-panel covering.

9. The protection system according to claim 8, wherein said protection system is integrated in said side-panel covering and forms together with it a preassembled unit.

10. The protection system according to claim 1, wherein said gas bag when deployed extends over at least approximately one half of a length of the respective side panel.

11. The protection system according to claim 1, wherein said gas bag is connected in terms of flow through a conduit to a second gas bag.

12. The protection system according to claim 1, wherein said side-panel covering is a door trim panel.

13. The protection system according to claim 1, wherein it is integrated in a front door and said gas bag when deployed extends beyond said door towards the rear and covering a B-pillar of said vehicle in a longitudinal direction.

14. The protection system according to claim 1, wherein said flap has a length corresponding to at least said pack length of said gas bag.

* * * * *

UNITED STATES PATENT AND TRADEMARK OFFICE
CERTIFICATE OF CORRECTION

PATENT NO. : 6,325,410 B1
DATED : December 4, 2001
INVENTOR(S) : Heinz Eyrainer

It is certified that error appears in the above-identified patent and that said Letters Patent is hereby corrected as shown below:

<u>Title page,</u>
Item [30], Foreign Application Priority Data, replace "Sep. 8, 2000" with
-- Sep. 8, 1999 --.

Signed and Sealed this

Fourth Day of February, 2003

JAMES E. ROGAN
*Director of the United States Patent and Trademark Office*